E. KAYSER.
BALL BEARING.
APPLICATION FILED DEC. 26, 1907. RENEWED FEB. 14, 1917.

1,238,783.

Patented Sept. 4, 1917.

UNITED STATES PATENT OFFICE.

EUGEN KAYSER, OF BERLIN, GERMANY, ASSIGNOR TO THE HESS-BRIGHT MANUFACTURING COMPANY, OF PHILADELPHIA, PENNSYLVANIA.

BALL-BEARING.

1,238,783.

Specification of Letters Patent.

Patented Sept. 4, 1917.

Application filed December 26, 1907, Serial No. 408,011. Renewed February 14, 1917. Serial No. 148,593.

*To all whom it may concern:*

Be it known that I, EUGEN KAYSER, a citizen of the German Empire, residing at Berlin, Germany, have invented certain new and useful Improvements in Ball-Bearings, of which the following is a specification, reference being had therein to the accompanying drawing.

My invention relates to anti-friction bearings, and more particularly to the "full" type thereof, wherein the raceway is completely or almost filled with the rolling elements. In bearings of this type various means have been devised for introducing the rolling elements into proper position between the casing members, and a variety of expedients have been employed for this purpose, such as constructing the casing members in sections, forming filling openings therein, varying the form of the tracks or ways, and other similar means. It is the purpose of my invention, however, to secure the desired result, namely filling the raceway entirely or approximately with the rolling elements, without resort to such expedients and arrangements.

To this end I construct the bearing portion of one or both of the casing members as a continuous ring, but of such reduced cross-section as to permit its deformation to a sufficient extent to allow the insertion of the rolling elements into the raceway, after which its natural elasticity causes it to assume its proper and original form. I am aware that a discontinuous or split ring has been employed for the same purpose, but to avoid the disadvantages therefrom arising, for instance, the interruption in the race-way due to its disconnected ends, I employ a continuous or unbroken ring and rely upon its reduced cross-section to permit of its deformation for the purposes specified. In other words, I so reduce the ring that it will be of such thinness and flexibility as to require external support to give it the necessary rigidity for use in practice. When so reduced, the bearing ring may be supported or strengthened in any suitable manner, but I prefer to employ for this purpose a reinforcing ring which forms part of the bearing itself. In the accompanying drawing I have disclosed in preferred form a bearing embodying my invention and provided with such a continuous bearing ring of reduced cross-section, and have conventionally illustrated also a support or reinforcing means therefor. I do not, however, desire to confine myself to the form shown and described, and generally speaking I wish it to be understood that the invention itself is not limited to any specific form or arrangement of parts except in so far as such limitations are specified in the claim.

Referring to the drawing:—

Figure 1:
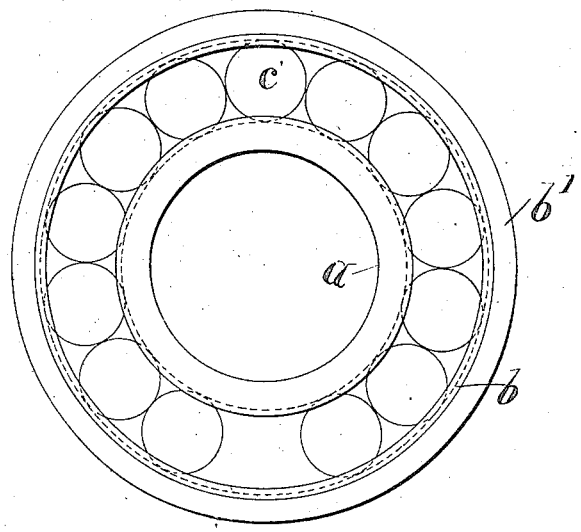
Figure 1 is a side view of an anti-friction bearing embodying my invention.
Figure 2:
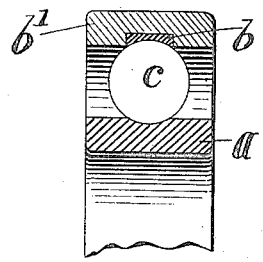
Fig. 2 is a transverse sectional detail view thereof.

The bearing consists of the inner casing member or ring $a$ and the outer bearing ring $b$, connected to the reinforcing ring or element $b^1$, and constituting therewith the outer casing member. The rolling elements, shown by way of example in the present instance as the balls $c$, are mounted in the customary manner in tracks or ways formed respectively in the inner casing member $a$ and the outer bearing ring $b$. The bearing ring $b$ is continuous and unbroken throughout its extent, and is of materially reduced cross-section, as shown in Fig. 2. Due to this decrease in its size and weight, its capability of deformation is largely increased, and it may be bent or deformed to an extent sufficient to permit the introduction between it and the inner casing member of a sufficient number of balls so as to completely or almost fill the raceway. After the insertion of the balls in the raceway by the deformation of the bearing ring $b$, its natural elasticity causes it to resume its normal shape and position. I am thus enabled without the use of sectional casing members, filling openings, or the like, to assemble a bearing of the "full" type, and at the same time to preserve the continuity and unbroken character of the bearing ring, as distinguished from the broken or split ring previously employed for this purpose. If it be desired to strengthen or reinforce the reduced bearing ring $b$, so as to restore the bearing to its normal shape and carrying capacity, I may employ for such purpose an exterior ring or reinforcing means as indicated at $b^1$. The particular form and characteristics of such reinforcing means, however, constitute no part of my invention, as any such means may be employed. The ring $b^1$, for instance, may be connected to the bearing ring $b$ by casting after the bearing is otherwise assembled, or in any desired or well known way. For instance, in my application for U. S. Letters Patent No. 408,010, filed as of even date herewith, I have set forth such reinforcing means as comprising a plurality of parts which are detachably connected to each other and to the bearing ring. In the drawing herein, I have shown the reduced bearing ring as constituting a portion of the outer casing member, but obviously it might be employed in connection with the inner casing member, or with both casing members. Other variations will similarly suggest themselves to those skilled in the art, and I do not limit myself to the exact embodiment of the invention shown, which I have illustrated only in a preferred form, as many equivalents are equally comprised within its scope.

Having thus described my invention, its construction and mode of operation, what I claim and desire to secure by Letters Patent of the United States is as follows:

In an antifriction bearing, the combination of inner and outer casing members and intermediate balls, one of said casing members comprising a continuous ring of reduced cross section and of freely deformable elastic material, said ring having on its face a relatively deep ball groove, forming a ball track continuous and uninterrupted throughout the ring, and capable of resisting heavy axial thrusts in both directions, and a stiff reinforcing ring of relatively greater cross sectional area, firmly applied to the deformable ring and serving to maintain the circular shape of the latter.

In testimony whereof, I affix my signature in presence of two witnesses.

EUGEN KAYSER.

Witnesses:
 WOLDEMAR HAUPT,
 HENRY HASPER.